INVENTORS.
GÜNTHER STRAUSS
WALTER THOMAS

BY *L. William Millen*

ATTORNEY

# United States Patent Office 3,431,255
Patented Mar. 4, 1969

3,431,255
PROCESS FOR THE CONTINUOUS MANUFACTURE OF LAUROLACTAM IN THE LIQUID PHASE
Günther Strauss and Walter Thomas, Marl, Germany, assignors to Chemische Werke Huls A.G., Marl, Germany
Filed Feb. 2, 1966, Ser. No. 524,395
Claims priority, application Germany, Feb. 3, 1965, C 35,001; Sept. 6, 1965, C 36,810
U.S. Cl. 260—239.3
Int. Cl. C07d 41/06
12 Claims

ABSTRACT OF THE DISCLOSURE

In a process for the production of lactams such as laurolactam which comprises subjecting the corresponding oxime such as cyclododecanone oxime to a sulfuric acid rearrangement, the improvements of: mixing concentrated sulfuric acid with a solution of oxime in a hydrocarbon having a boiling point of about 80–200° C. with sulfuric acid at a temperature of about 20–50° C.; after separating the resultant solution of oxime in sulfuric acid from the solvent, conducting the rearrangement at about 90–120° C.; and then hydrolyzing the resultant solution in either a hydrocarbon having a boiling point of about 120–280° C., or the corresponding cycloalkanone, such as cyclododecanone, from the fractionating column used in connection with the production of the oxime. The process can be conducted either with the same or different solvents, and does not require the use of a neutralization step for hydrolysis. Dilute sulfuric acid is a by-product stream.

---

Figure 1:
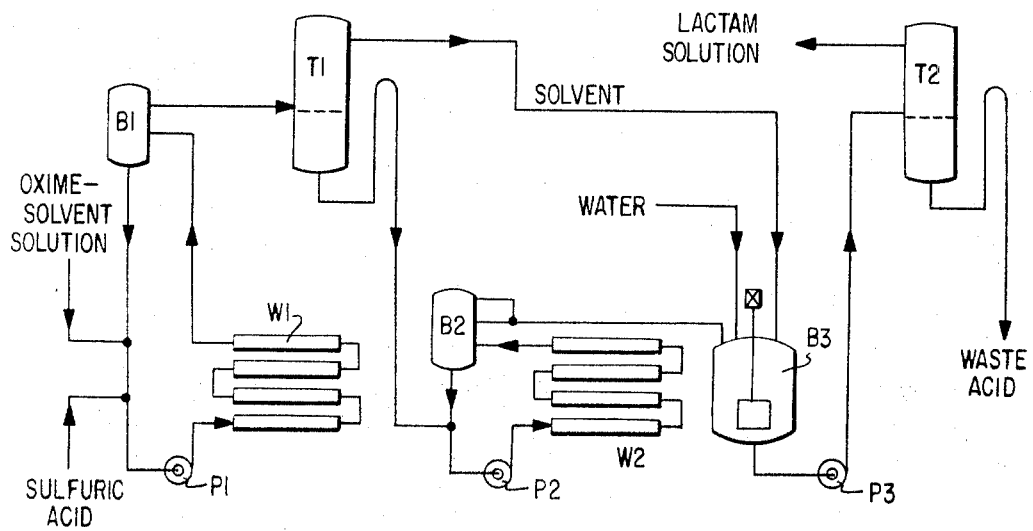

The present invention relates to an improvement in the process of manufacturing lactams by the Beckmann rearrangement of cyclic ketoximes in the presence of concentrated $H_2SO_4$ or oleum.

According to the prior art methods of lactam production such as disclosed in U.S. Patent No. 2,817,661, cyclopentanone oxime, cyclohexanone oxime, cycloheptanone oxime and alkylated derivatives thereof are subjected to the Beckmann rearrangement in the presence of concentrated $H_2SO_4$ (e.g. 90–100%) or oleum. The oximes, produced by the oximation of cycloaliphatic ketones, are reacted with concentrated $H_2SO_4$ and substantial amounts of heat are developed.

The heat produced results from the Beckmann rearrangement and the heat of formation of the oxime salt. Overheating occurs readily particularly when the oxime is employed in the solid form. Such overheating leads to decomposition reactions causing reductions in the yield and quality.

As a result of the overheating, the rearrangement reaction has been carried out in the presence of organic solvents. Such a modification by itself is not sufficient to avoid local overheating.

In the production of the lactams from low melting oximes of cycloaliphatic ketones, for example cyclohexanone, oximation and rearrangement reactions can be conducted without difficulty in the liquid phase.

In case of the higher melting cycloaliphatic ketones or the oximes thereof, particularly in case of cyclododecanone or cyclododecanone-oxime, as used in the present process, such a method of operating in the liquid phase is impossible. The oxime and the lactam of cyclododecanone are obtained in the form of solids under the prior art reaction conditions. Expensive apparatus susceptible to breakdown is required for the separation, purification, drying, conveying, and storage, etc. of these reaction products. When oximating, for example, cyclododecanone (melting point 60° C.) with an aqueous solution of hydroxylamine, the oxime formed (melting point 134° C.) precipitates as a finely crystalline precipitate as the reaction progresses. In order to further process the precipitate, the abovementioned expensive methods and apparatus are necessary. Conducting the oximation at a temperature above the melting point of the oxime is not feasible, not only because pressurized apparatus must be employed in order to carry out the reaction, but also because the oximation reaction begins to break down and in the temperature range around 140° C. the oxime starts to decompose.

According to another proposed method, the oximation and the Beckmann rearrangement are conducted above 70° C. in the liquid phase in the presence of a cycloaliphatic solvent immiscible with water. This method has the disadvantage that the rearrangement of the oxime with concentrated sulfuric acid or oleum in the presence of a solvent produces byproducts by the decomposition of the hard to remove solvent. Even if the solvent is considered to be substantially resistant to the sulfuric acid or oleum, such a process leads to unavoidable losses in solvent and requires a considerable expenditure for removing the byproducts. According to this method, local overheating in the rearrangement stage, which has a deleterious effect on yield and quality, cannot be avoided.

According to the present invention laurolactam is continuously produced in the liquid phase by the Beckmann rearrangement of cyclododecanone oxime with sulfuric acid or oleum when the following conditions and steps are employed:

(a) An extraction stage is employed wherein the oxime dissolved in a solvent immiscible with sulfuric acid or oleum is mixed with concentrated sulfuric acid or oleum at temperatures of 0–60° C., preferably 20–50° C., and the specific heat of the materials introduced as well as the heat produced by the combination of the oxime with the sulfuric acid are removed;

(b) An oxime-sulfuric acid phase free of solvent is separated from a solvent phase free of oxime;

(c) The oxime-sulfuric acid is passed to a rearrangement stage, and the oxime is rearranged into the lactam at temperatures between 60 and 140° C., preferably between 90 and 120° C.;

(d) The lactam-sulfuric acid mixture is passed to a hydrolysis stage, where water as well as the solvent employed in the extraction stage are added;

(e) A lactam-containing solvent phase is separated from a dilute sulfuric acid phase substantially free of lactam; and finally (f) The lactam-containing solvent phase is washed and then processed by fractional distillation.

It is a primary object of the present invention to provide an improved process for the production of laurolactam by the Beckmann rearrangement of cyclododecanone oxime.

Another object of the invention is an improved process for preparing lactams by the Beckmann rearrangement comprising the preparation of oxime-sulfuric acid solution and the rearrangement of the solution under controlled temperature conditions.

Still another object of the invention is the use of a solvent immiscible in concentrated sulfuric acid for the solution of the oxime used in the Beckmann rearrangement followed by separation and reuse of the solvent in the hydrolysis of the lactam-sulfuric acid solution produced by the rearrangement.

Yet another object of the invention is the use of a first solvent for the solution of the oxime prior to the Beckmann rearrangement and the use of a second solvent in the hydrolysis of the lactam-sulfuric acid solution produced by the rearrangement.

Still further objects and the entire scope of applicability of the present invention are apparent from the detailed description, examples and claims which follow.

The laurolactam produced by the present invention is useful in the preparation of polymers and the extrusion thereof into synthetic fibers as disclosed in Chemical Abstracts (1964), vol. 60, p. 3107, and the U.S.S.R. periodical abstracted therein.

The production of the prior art cyclododecanone oxime used as a raw material in the present invention is carried out by reacting the corresponding ketones with hydroxylamine salt solutions.

Although cyclododecanone oxime is a preferred starting material for conversion to the corresponding lactam by the process of the present invention, the following oximes may be processed: cyclooctanone, cyclononanone, cyclodecanone, and cycloundecanone.

The oximes are employed, in the present process, in the form of a solution. This solution can be produced by conducting the oximation of the ketone to the oxime in the presence of the solvent used. The solution can also be obtained by subsequent extraction of the oximation mixture with the solvent or, if desired, by dissolving the isolated oxime in the solvent.

In a preferred embodiment of this invention, the solvents must exhibit, at least at a higher temperature, a sufficient dissolving capacity for the oxime as well as for the lactam; they must be stable with respect to the sulfuric acid or the oleum in the extraction stage at the temperatures utilized therein; and they must not mix with the sulfuric acid or the oleum in the extraction stage at the temperatures utilized therein.

Particularly suitable solvents are cycloaliphatic hydrocarbons, such as, for example, hydrocumene, but also aliphatic hydrocarbons of a suitable boiling point range can be employed. Other suitable solvents are cyclododecane, cyclododecanone, n-decane, n-undecane, n-dodecane. By the term "immiscible" with sulfuric acid is meant that the solvent is substantially immiscible with sulfuric acid and likewise by the term "free" used in step (b) and in the specification is meant substantially free, that is to say, the oxime-sulfuric acid phase should contain not more than 1 to 2% of the solvent.

The use of aromatic solvents is not excluded, but is to be avoided generally because they are readily sulfurized. Useful aromatic solvents are: isopropylbenzene and di-isopropylbenzene.

The aliphatic, cycloaliphatic and aromatic hydrocarbons have a suitable boiling point between 80 and 200° C.

Since the reaction temperature in the preceding oximation stage is generally 80 to 120° C. and the solvents should be liquid under the reaction conditions, elevated pressures are used, if the solvents boil below the reaction temperature.

Generally, the oxime solution is employed in the same state as it was produced, i.e., having temperatures of 80–120° C., preferably 90–100° C. Of course, it is possible to use solutions at a lower temperature where the temperature may range from 60 to 80° C.

In the first step of the present process, i.e., the extraction stage, the oxime solution is continuously mixed with concentrated sulfuric acid or oleum. The following conditions are maintained for the extraction stage:

The extraction is conducted at temperatures of 0–60° C., particularly 20–50° C., so that the spontaneous initiation of the strongly exothermic rearrangement reaction is impossible.

The heat produced by the preferred extraction of the oxime into the sulfuric acid along with the heat introduced by warm oxime solution is removed by cooling means.

The quantity of the sulfuric acid used is sufficient to produce a usable viscosity in the oxime-containing sulfuric acid produced within the above-mentioned temperature range, and is sufficient for the subsequent rearrangement stage. The sulfuric acid employed, based on 1 part of oxime, is generally about 1 to 1.5 parts by weight.

The viscosities for the weight proportions of oxime to sulfuric acid of 1 to 0.8 are.:

at 20° C.:20,000 centipoises
at 40° C.:2,700 centipoises;

at a weight proportion of 1:1.25:

at 20° C.:987 centipoises
at 40° C.:330 centipoises

Figure 2:
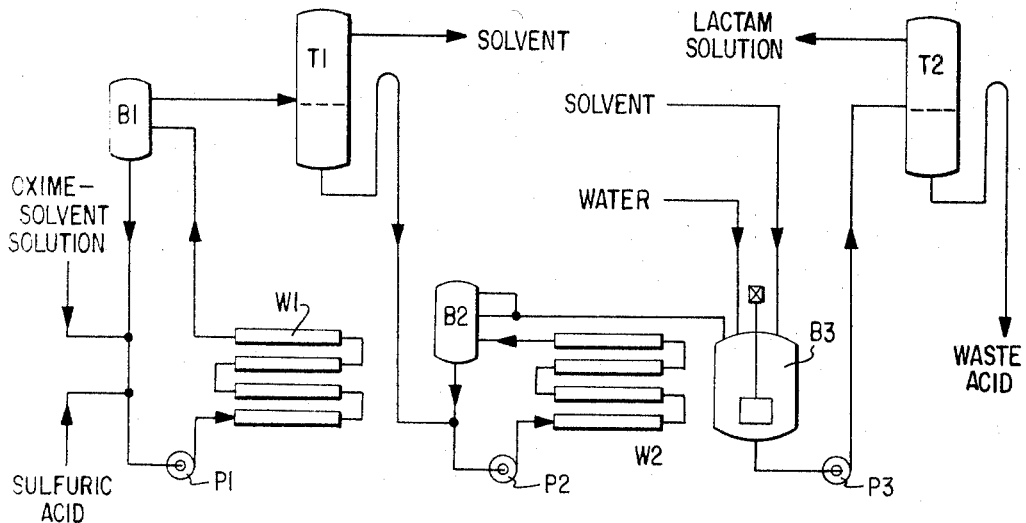

The extraction stage, first separation stage, rearrangement stage, hydrolysis stage and second separation stage of the present invention can be carried out in an apparatus such as disclosed in the drawings of the present invention, wherein:

FIGURE 1 is a flow sheet of a preferred embodiment of the invention showing the use of the same solvent in the extraction and hydrolysis stages; and FIGURE 2 is a flow sheet showing a modification of the process shown in FIGURE 1 facilitating the use of a first solvent of variable concentration or a second solvent in the hydrolysis stage.

The extraction is conducted in apparatus suitable for the continuous mixing and cooling of two liquid phases insoluble with respect to one another.

As shown in FIGURE 1, the extraction system comprises container B1, the cooler W1, and the pump P1.

The mixture of solvent, cyclododecanone oxime, and sulfuric acid or oleum having a composition corresponding to the condition after the stationary state has been reached, is cycled in the apparatus.

The two components of the extraction, namely the solution of the oxime in the solvent and the sulfuric acid or the oleum, are continuously charged into the cycled stream, suitably at a point where the immediate thorough mixing of the fresh material with the cycled stream is insured. The two components are advantageously charged in separate pipelines.

The extraction is accomplished extraordinarily rapidly if the two phases are well mixed with each other, and from a quantitative point of view is generally terminated after a few minutes. The regulation of the conditioning time in the system can be accomplished, for example, by maintaining a given level in the container B1.

The extraction process is accompanied by a considerable development of heat which results from the complexing of the oxime with the sulfuric acid. The quantity of heat produced must be removed by cooling means in order to avoid spontaneous heating of the oximum-sulfuric acid complex which leads to the initiation of the rearrangement reaction. Depending on whether or not hot oxime solution is used, this amount of heat must be removed, too.

The amount of heat removed in the extraction stage under the most gentle conditions amounts to more than 60% of the heat removed during the entire process. This means that the main source of spontaneous reaction heat is removed before the rearrangement stage and the yield and quality of the lactam are more easily controlled. The extraction mixture leaves the container B1 in a continuous stream and enters the separating vessel T1 where the reaction mixture is separated into pure oxime-free solvent and oxime-sulfuric acid solution. The oxime-sulfuric acid solution is introduced into the rearrangement stage.

The rearrangement stage can comprise, for example, the container B2, the cooler W2, and the pump P2. The mixture of the lactam and sulfuric acid or the oleum, corresponding to the composition after the stationary rearrangement state has been established, is cycled therein at the desired reaction temperature. Portions of lactam-sulfuric acid solution are continuously withdrawn from the rearrangement system processing in the hydrolysis stage B3, while the rearrangement stream is supplemented by constant charging of fresh oxime-sulfuric acid solution from the separating vessel T1. In place of the one-stage reactor system P2, W2, B2, it is of course possible to employ a two- or multistage cascade whereby shorter reaction times are obtained. The reaction time of the mixture in the system P2, W2, B2 is determined so that a substantially quantitative conversion of the lactam is obtained. This reaction time depends upon the amount and concentration of the sulfuric acid or the oleum, as well as upon the temperature.

Generally, reaction times of about 10 to 60 minutes are employed for temperatures between 90 and 120° C.

A tabulation of the interrelated variables of reaction temperature, acid concentration, proportion of oxime to sulfuric acid and one- or two-stage rearrangement and their effect upon the conversion of oxime is set forth in the following table:

| Weight proportion oxime.sulfuric acid | Percent sulfuric acid concentration | No. Beckmann rearrangement stages | Reaction temp., ° C. | Reaction in min. | Conversion of oxime in Percent |
|---|---|---|---|---|---|
| 1:0.8 | 95 | 1 | 115 | 30 | 80.6 |
| 1:1 | 95 | 1 | 115 | 30 | 89.1 |
| 1:1.25 | 96 | 1 | 115 | 30 | 98 |
| 1:1.25 | 96 | 1 | 120 | 20 | 99 |
| 1:1.25 | 98 | 1 | 115 | 15 | 99 |
| 1:1.25 | 96 | 2 | 100 | 2×30 | 96.4 |
| 1:1.25 | 96 | 2 | 115 | 2×15 | 99.3 |
| 1:1.25 | 96 | 2 | 115 | 2×30 | 99.9 |

The rearrangement product of lactam-sulfuric acid solution continuously withdrawn from vessel B2 is separated in the hydrolysis stage B3 into dilute sulfuric acid and a solution of lactam in a solvent. The lactam content of the mixture introduced into the hydrolysis stage generally amounts to 30–55% by weight, preferably 40–50% by weight.

The rearrangement mixture from vessel B2, water and a solvent are continuously charged into vessel B3 having agitation means. Enough water is added so that a dilute sulfuric acid is obtained which separates from the organic phase. The concentration of this dilute sulfuric acid will be generally about 15–45% $H_2SO_4$ by weight of solution, and preferably 20–30% by weight.

Even though any suitable solvent means appears to be usable as the solvent for receiving the lactam liberated during the hydrolysis step, the pure solvent separated in the separating vessel T1 is, in the embodiment of FIGURE 1, introduced directly into the vessel B3. The solvent passes through the further purification stages as the carrier for the lactam and may be returned to an oximation stage, not shown, after the lactam has been separated by distillation.

In the particularly advantageous embodiment of FIGURE 2, two solvent cycles are employed, i.e., the solvent from the separating vessel T1 may be cycled into the oximation stage.

As shown in FIGURE 2, between the vessel B3 and the processing stage of the purified lactam solution where the lactam is generally processed in a qualitative manner, a separate solvent cycle is inserted. Such a method of operation is advantageous because different solvent concentrations can be employed in the two cycles, i.e., different amounts in the cycles.

Furthermore, an oxime breakthrough from the system P1, W1, B1 via the separating vessel T1 to the vessel B3 is avoided in case of fluctuations in the process.

The apparatus of FIGURE 2 is also useful for another embodiment of the invention where a separate solvent cycle is employed for the extraction stage and for the hydrolysis stage.

New and unexpected results have been found when different solvents are employed in the extraction stage and in the hydrolysis stage.

Since no concentrated sulfuric acid is present in the second separation stage after hydrolysis, less resistant solvents can be used. Preferably higher boiling solvents are employed having boiling points under the subsequently employed distillation conditions, particularly under the conditions of a vacuum distillation, above the melting point of the lactam of 152° C. As a result, the fractional distillation of the washed, lactam-containing solvent phase is simplified since the lactam cannot crystallize in the distillation column.

Suitable solvents usable in the hydrolysis stage with water are preferably cycloaliphatic hydrocarbons, such as p-diisopropylcyclohexane, cyclododecane, and preferably cyclododecanone. Along with the cycloaliphatic hydrocarbons, aliphatic and aromatic hydrocarbons are also useful where the boiling point range for the hydrocarbons is 120 to 286° C. Specific solvents useful are: n-dodecane, n- tridecane, n-tetradecane and diisopropylbenzene.

The solvents are employed in amounts sufficient for maintaining the liquid phase.

In the present embodiment, two solvent cycles are employed, i.e., the solvent from the separating vessel T1 is then recycled into the oximation stage.

Between the vessel B3 and the processing stage of the purified lactam solution, a separate solvent cycle is inserted and another solvent is employed. Such a method of operation has the advantage that different solvent concentrations can be employed in the two cycles, i.e., different amounts of the cycles. However, there is the further particular advantage that, when the lactam solution is processed in the distillation system, the free selection of the solvent avoids any interference caused by crystallizing lactam.

In all the above embodiments the mixture forced from the vessel B3 by means of pump P3 into the separating vessel T2 is therein separated into dilute sulfuric acid and lactam solution. The hot dilute sulfuric acid in T2 having a concentration of 15–45% by weight and preferably 20–30% by weight, still contains about 0.3% lactam in solution.

This lactam amount can easily be recovered by cooling the hot acid with crystallization of the lactam therefrom, or the solvent, before introduction into the hydrolysis stage B3, can be employed for washing the waste acid in a suitable apparatus.

The lactam solution separated from T2 is washed in a known manner and processed by fractional distillation and, if desired, under decreased pressure. A suitable method of washing $C_4$–$C_{12}$ lactam is disclosed in French Patent No. 1,332,193.

The process, in addition to having the advantage that most of the heat is removed in the extraction stage and thereby the rearrangement stage is relieved of an extraordinary thermal load has the further advantage that the reaction mixture is always liquid and homogeneous, and the rearrangement proper is conducted in the absence of a solvent whereby the resistance of the solvent to rigorous conditions does not have to be considered.

According to the present process, lactams are obtained in high yields and extraordinary purity.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Into an agitated vessel B1 of two liters capacity serving the extraction system P1, W1, B1, there are introduced in a continuous stream via a first heated measuring receiver, 2.3 kg./hr. of an approximately 30% solution of cyclododecanone oxime in hydrocumene at a charging temperature of about 90° C. Simultaneously, via a second measuring receiver, 0.87 kg./hr. of 96% sulfuric acid is added under vigorous agitation. The temperature of the extraction vessel is maintained at 40° C. by cooling.

Suitable adjustable overflow means is provided on B1 to maintain the filling volume of B1 to about 1.0 liter, and the resulting reaction time at about 20 minutes. Approximately 3.2 kg./hr. of a mixture of hydrocumene and oximesulfuric acid are withdrawn and separated into two phases, in the separating flask T1, at 40° C., and a separation time of about 30 minutes.

While the oxime-free hydrocumene passes directly into the hydrolysis portion as shown in the embodiment of FIGURE 1, about 1.6 kg./hr. of the substantially solvent-free oxime-sulfuric acid flow into 2 liter vessel B2. The vessel B2 serves in the rearrangement system P2, W2, B2 and has agitation means and a filling volume of about 1.2 liter maintained by adjustable overflow means. The temperature in the rearrangement vessel is kept at 115–117° C. by cooling means W2. The conditioning time, under the above-mentioned charging conditions, amounts to about 60 minutes.

From the overflow pipe of the rearrangement vessel B2, about 1.6 kg./hr. of the mixture consisting of lactam-sulfuric acid are withdrawn and vigorously stirred in an agitated vessel B3 of 4 liters capacity serving as the hydrolysis stage. To the vessel B3 are also added about 2.5 kg./hr. of water along with the hydrocumene withdrawn from T1. The hydrolysis is carried out at about 90–100° C. The conditioning time is approximately 30 minutes.

Through an overflow pipe, about 5.7 kg./hr. of the resultant hydrolysis mixture are introduced into a separator T2. In this separator, at about 90–100° C. and at a separating time of 30 minutes, the reaction mixture is separated into about 2.3 kg. of a first phase of approximately 30% solution of lactam in hydrocumene along with a second phase of about 3.3 kg. of approximately 25% sulfuric acid. The hot waste acid still contains about 0.3% dissolved lactam, corresponding to about 1–2% of the converted lactam. This dissolved lactam can readily be recovered by cooling the hot acid with crystallization of the lactam, or by employing the hydrocumene, before being charged into the hydrolysis stage B3, for washing the waste acid in a suitable apparatus.

The lactam solution withdrawn from the separator T2 is conventionally subjected to a one- or multi-stage washing processes an is then suitably passed to a distillation processing stage.

When 0.70 kg./hr. of a 98% cyclododecanone oxime are employed, there is obtained 0.656 kg./hr. of a distilled pure lactam having a melting point of 151–152° C. and an APHA color number of 5–10. This corresponds to a theoretical yield of 95.5%.

Example II

The method of Example I is repeated according to the embodiments of FIGURE 2. From the overflow pipe of the rearrangement vessel B2, about 1.6 kg./hr. of the mixture consisting of lactam-sulfuric acid are withdrawn and vigorously stirred in an agitated vessel of 4 liters capacity serving as the hydrolysis stage B3. About 2.5 kg./hr. of water, along with 1.1 kg./hr. of cyclododecanone recycled in the liquid phase from the distillation stage, not shown, are added simultaneously to B3. The temperature is maintained at about 95–100° C. The mixing time is about 30 minutes.

Through an overflow pipe, about 5.2 kg./hr. of the resultant hydrolysis mixture are introduced into separator T2. The separation is conducted at about 95–100° C. for about 30 minutes with a first phase of about 1.8 kg. of approximately 40% solution of lactam in cyclododecanone, and a second phase of about 3.4 kg. of approximately 25% sulfuric acid resulting. The hot waste acid still contains about 0.3% dissolved lactam, as well as traces of cyclododecanone. Both substances can easily be recovered by cooling the hot acid or by employing, for example, the solvent of the extraction stage after it has been used in that stage, for washing the waste acid in a suitable apparatus. The cyclododecanone introduced into the oximation process in this manner is thus returned again to the lactam production with hardly any losses.

The small amounts of lactam likewise pass, without appreciably burdening the oximation and rearrangement stages, via the extraction stage into the final stage.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for recovering a lactam from the reaction mixture obtained by sulfuric acid rearrangement of oximes of cycloaliphatic ketones of 8–12 carbon atoms, the improvement comprising:
   (a) mixing concentrated sulfuric acid with a solution of oxime and a first solvent imiscible with sulfuric acid selected from the group consisting of aliphatic, cycloaliphatic and aromatic hydrocarbons having a boiling point between about 80 and 200° C. at a temperature about 0 to 60° C. whereby a solution of oxime in sulfuric acid is formed;
   (b) separating said solution of oxime in sulfuric acid from said first solvent immiscible with sulfuric acid;
   (c) reacting said solution of oxime in sulfuric acid at a temperature about 60 to 140° C. whereby said oxime is rearranged to the corresponding lactam and a mixture of lactam and sulfuric acid is formed;
   (d) without performing a neutralization step, hydrolyzing at 90–100° C. said mixture of lactam and sulfuric acid with water and a second solvent immiscible with sulfuric acid selected from the group consisting of aliphatic, cycloaliphatic and aromatic hydrocarbons having a boiling point between about 120 and 280° C. whereby a lactam containing solvent phase and a dilute sulfuric acid phase are formed;
   (e) separating said lactam containing solvent phase and said dilute sulfuric acid phase; and
   (f) recovering the lactam from said lactam containing solvent phase.

2. The process of claim 1, wherein the temperature of mixing step (a) is maintained at about 20 to 50° C. and the rearrangement temperature of (c) is maintained at about 90 to 120° C.

3. The process of claim 1, wherein said concentrated sulfuric acid of (a) is oleum.

4. The process of claim 1, wherein said oxime of (a) is cyclododecanone oxime and said lactam of (f) is laurolactam.

5. The process of claim 1, wherein said first solvent immiscible with sulfuric acid separated in (b) is said second solvent immiscible with sulfuric acid of (d).

6. The process of claim 1, wherein recovering the lactam of (f) comprises washing said lactam containing solvent phase and processing by fractional distillation.

7. The process of claim 1, wherein said temperature of (a) and (c) is maintained by circulation and cooling.

8. The process of claim 4, wherein the temperature of mixing step (a) is maintained at about 20 to 50° C. and the rearrangement temperature of (c) is maintained at about 90 to 120° C.

9. A process as defined by claim 1 wherein said second solvent is n-dodecane, n-tridecane, n-tetradecane, and diisopropyl benzene.

10. A process as defined by claim 4 wherein said second solvent is n-dodecane, n-tridecane, n-tetradecane, and diisopropyl benzene.

11. A process as defined by claim 8 wherein said second solvent is n-dodecane, n-tridecane, n-tetradecane, and diisopropyl benzene.

12. In a process for the production of laurolactam, the steps of:
  (a) mixing concentrated sulfuric acid wtih a solution of cyclododecanone oxime and a hydrocarbon solvent immiscible with sulfuric acid and having a boiling point of about 80–200° C., said mixing being conducted at a temperature of about 20–50° C., whereby a solution of cyclododecanone oxime in sulfuric acid is formed;
  (b) separating said solution of oxime in sulfuric acid from said hydrocarbon solvent;
  (c) reacting resultant solution of oxime in sulfuric acid at about 90–120° C. to effect rearrangement, thereby forming a mixture of lactam and sulfuric acid;
  (d) hydrolyzing said mixture of lactam and sulfuric acid at 90–100° C. without a neutralization step, and in the presence of water and cyclododecanone, and a dilute sulfuric acid phase;
  (e) separating the dilute sulfuric acid phase from the solution of cyclododecanone and laurolactam; and
  (f) recovering the laurolactam from the cyclododecanone solution.

References Cited

UNITED STATES PATENTS

| | | | |
|---|---|---|---|
| 2,249,177 | 7/1941 | Schlack | 260—239.3 |
| 2,313,026 | 3/1943 | Schlack | 260—239.3 |
| 2,573,374 | 10/1951 | Wichterle | 260—239.3 |
| 2,692,878 | 10/1954 | Kahr | 260—239.3 |
| 3,060,173 | 10/1962 | Von Schickh et al. | 260—239.3 |
| 3,334,089 | 8/1967 | Harms et al. | 260—239.3 |

HENRY R. JILES, *Primary Examiner.*

R. T. BOND, *Assistant Examiner.*

U.S. Cl. X.R.

260—294.7, 326.5

UNITED STATES PATENT OFFICE
CERTIFICATE OF CORRECTION

Patent No. 3,431,255 March 4, 1969

Günther Strauss et al.

It is certified that error appears in the above identified patent and that said Letters Patent are hereby corrected as shown below:

Column 2, line 47, "solven" should read -- solvent --. Column 7, line 41, "an" should read -- and --. Column 9, line 17, after "cyclododecanona," i -- thereby forming a solution of laurolactam and cyclododecanone, --.

Signed and sealed this 7th day of April 1970.

(SEAL)
Attest:

Edward M. Fletcher, Jr.
Attesting Officer

WILLIAM E. SCHUYLER, J]
Commissioner of Patent